United States Patent [19]

Matschke et al.

[11] 3,883,489

[45] May 13, 1975

[54] PROCESS FOR THE PREPARATION OF A DISPERSIBLE VINYL ACETATE/ETHYLENE POLYMER POWDER

[75] Inventors: Klaus Matschke, Hausen; Karl Josef Rauterkus; Detlev Seip, both of Kelkheim, Taunus; Wolfgang Zimmermann, Frankfurt am Main, all of Germany

[73] Assignee: Hoechst Aktiengesellschaft, Frankfurt am Main, Germany

[22] Filed: Mar. 19, 1973

[21] Appl. No.: 342,492

[30] Foreign Application Priority Data

Mar. 24, 1972  Germany............................ 2214410

[52] U.S. Cl............... 260/78.5 R; 260/29.6 RB; 260/29.6 T; 260/29.6 H; 260/29.6 BE; 260/29.6 SQ; 260/29.6 PS; 260/29.7 T; 260/78.5 E; 260/78.5 UA; 260/79.3; 260/80.3 R; 260/80.8; 260/80.81; 260/87.3
[51] Int. Cl......... C08f 1/11; C08f 1/88; C08f 15/02
[58] Field of Search...... 260/78.5 E, 78.5 R, 78.5 T, 260/78.5 UA, 87.3, 80.8, 80.81, 96 R, 79.3, 29.6 RB, 29.6 T, 29.6 H, 29.6 BE, 29.6 SQ, 29.6 PS

[56] References Cited
UNITED STATES PATENTS

| 3,453,245 | 7/1969 | Glavis .............................. 260/78.5 |
| 3,532,658 | 10/1970 | Gintz .............................. 260/29.6 |
| 3,578,618 | 5/1971 | Beardsley............................ 260/17 |
| 3,725,375 | 4/1973 | Sturt ............................. 260/92.8 W |
| 3,755,237 | 8/1973 | Isaacs et al................. 260/29.6 TA |

Primary Examiner—Joseph L. Schofer
Assistant Examiner—John Kight, III
Attorney, Agent, or Firm—Curtis, Morris & Safford

[57] ABSTRACT

Vinyl acetate/ethylene copolymer powders are obtained by spray-drying of the corresponding aqueous polymer dispersions while simultaneously adding finely divided inorganic materials as anti-caking agents. The polymer powders thus obtained have an excellent storage stability, are easily dispersible in water and yield plastics mortars of high water resistance and plasterings made therefrom which are free from cracks.

3 Claims, No Drawings

PROCESS FOR THE PREPARATION OF A DISPERSIBLE VINYL ACETATE/ETHYLENE POLYMER POWDER

This invention relates to a process for the preparation of an easily dispersible vinyl acetate/ethylene polymer powder which is used e.g. as binding agent in plastics containing mortars.

Dispersible powders of vinyl acetate/ethylene-copolymers are known. The following requirements have to be met by such a polymer powder: it should be capable of flowing freely, have a long storage life and good dispersibility in water. The dispersion obtained with water from the polymer powder should have a minimum film forming temperature of approx. 0°C and its particles should have approximately the same average particle size as those of the initial dispersions. The dispersions should also be stable over a longer period of time, i.e., they should have no tendency to sedimentation. Furthermore, the polymer powders should be suitable as binding agents for plastics mortars. The plasterings made therewith should be free from cracks and resistant to water.

These requirements are fulfilled only partly by the known vinyl acetate/ethylene-copolymer powders which are prepared from vinyl acetate/ethylene-copolymer dispersions by spray drying with the addition of anti-caking agents. In particular the plasterings prepared with mortars containing these powders are not free from cracks and are not very water resistant. Both these properties are, however, most essential for the application of the mortars.

The present invention provides a process for the preparation of a free-flowing and easily dispersible polymer powder comprising a vinyl acetate-ethylene copolymer, wherein an aqueous dispersion prepared by polymerization of vinyl acetate at an ethylene pressure of up to 100 atmospheres, and in the presence of from 0 to 1 % by weight, calculated on the polymer, of an ionic emulsifier of from 5 to 20 % by weight, calculated on the polymer, of at least one polyvinyl alcohol with a degree of saponification of from 80 to 92 mol % and a viscosity of the 4 % aqueous solution at 20°C of from 3 to 35 cP, and of a free radical initiator, is spray dried, and simultaneously of from 3 to 30 % by weight, calculated on the solids content of the aqueous dispersion of finely dispersed aluminium silicate, silica or calcium carbonate having an average particle size of from 0.01 to 0.5 $\mu$ are introduced in the dry state in the spray tower as anti-caking agents.

The aqueous vinyl acetate/ethylene copolymer dispersions contain approximately 5 to 40 % by weight, calculated on the polymer, of polymerized ethylene. If further monomers are used together with vinyl acetate and ethylene the polymer should, preferably, contain polymerized vinyl acetate in an amount of at least 45 % by weight. As further monomers there may be used olefinically unsaturated monomers, for example vinyl esters of straight chain or branched saturated aliphatic mono-carboxylic acids having 3 to 18 carbon atoms, acrylic, methacrylic, maleic, or fumaric acid esters of straight chain or branched saturated monohydric aliphatic alcohols having 1 to 18 carbon atoms, vinyl chloride, isobutylene or higher $\alpha$-mono-olefins having 4 to 12 carbon atoms. Further to the monomer combination vinyl acetate and ethylene other suitable monomer combinations are, for example, vinyl acetate/vinyl pivalate/ethylene, vinyl acetate/2-ethyl-hexanoic acid vinyl ester/ethylene, vinyl acetate/methyl methacrylate/ethylene and vinyl acetate/vinyl chloride/ethylene. Preferable are monomer combinations having a minimum film formation temperature of the corresponding aqueous dispersions of approximately 0°C. Besides the monomers mentioned also other monomers having a stabilizing action can be used, for example, the sodium salt of vinyl sulfonic acid, monomers containing carboxylic groups, such as acrylic, methacrylic, crotonic, or itaconic acid or monoesters of maleic acid, the alcohol components of which can contain 1 to 18 carbon atoms, in a concentration of up to 5 % by weight, calculated on the total polymer. In addition monomers with two or more unsaturated double bonds can be used as cross-linking components, such as diallyl maleate, diallyl phthalate, triallyl cyanurate, tetraallyl oxyethane or adipic acid divinyl ester.

The aqueous vinyl acetate/ethylene dispersions can be prepared in various ways at ethylene pressures of up to approximately 100 atmospheres, preferably from 10 to 60 atmospheres. For example, a batch-process can be used in which the total amount of monomer is emulsified in the aqueous medium before the beginning of polymerization. Preferably, however, a monomer feed process is used in which at a certain ethylene pressure, vinyl acetate or mixtures of vinyl acetate and other olefinically unsaturated monomers are added continuously to an aqueous medium. The ethylene pressure can be kept constant during the whole feed period, the process can, however, also be carried out at increasing or decreasing pressure. As protective colloids for the preparation of the vinyl acetate/ethylene dispersions one or more polyvinyl alcohols are used having a degree of saponification of from 80 to 92 mol %, preferably from 86 to 89 mol % and a viscosity of the 4 % aqueous solution at 20°C of from 3 to 35 cP. The quantity of polyvinyl alcohol, calculated on the polymer, is from 5 to 20 % by weight, preferably from 10 to 15 % by weight. For the preparation of the polymer powder of the invention 50 to 90 % of the protective colloid used is advantageously contained at the beginning of the polymerization in the aqueous medium and 10 to 50 % is added to the finished dispersion in the form of an aqueous solution.

In addition to the polyvinyl alcohols used as protective colloid up to 1 %, calculated on the polymer of ionic emulsifiers can be used, preferably emulsifiers of the alkyl sulfate type having 10 to 16 carbon atoms.

The pH of the dispersion medium is adjusted in the range of 4 to 7.5. For adjusting the desired pH of the dispersion medium a suitable buffer, such as for example sodium acetate, sodium bicarbonate or sodium phosphate can be added.

The polymerization temperature is between 20° and 100°C, preferably between 50° and 70°C.

As polymerization initiators free radical initiators are used. There can be used the usual water-soluble peroxo compounds, such as ammonium, sodium or potassium persulfate, hydrogen peroxide, or perborates, or monomer-soluble compounds, such as for example t-butyl hydroperoxide or cumene hydroperoxide, alone or also in the form of redox systems. The individual components can be added to the dispersion medium either before the polymerization or at the same time as the monomers or separately during polymerization.

The solids content of the vinyl acetate/ethylene dispersions prepared in this way is approximately 30 to 60

% by weight. Preferably, dispersions are prepared with a solids content of approximately 40 to 60 % by weight. After the polymerization is finished a solids content, suitable for the spray drying, of approximately 30 to 45 % by weight is set by adding water or an aqueous polyvinyl alcohol solution.

The aqueous vinyl acetate-ethylene dispersions are converted by spray drying into dispersible polymer powders. When using dispersions with a minimum film forming temperature of approximately 0°C it has proved necessary to add fine particle inorganic substances as anti-caking agents during spray drying. If these admixtures are not used the dispersible powders do not have a sufficient storage life. Suitable inorganic admixtures are silica, calcium carbonates or aluminium silicates with an average particle size of 0.01 to 0.5 $\mu$.

Silica or aluminium silicates have proved especially advantageous as anti-caking agents. Polymer powders of particularly high storage stability are obtained when the anti-caking agents are contained in the polymer powder in a quantity of 4 to 20 % by weight, calculated on the solids content of the aqueous dispersion. The finer the particles of the anti-caking agents are, the less is the quantity necessary for stabilization.

The anti-caking agent is metered into the spray tower in dry form at the same time as, but separately from, the aqueous dispersion, whereby hardly any deposit forms on the walls of the dryer.

The vinyl acetate/ethylene copolymer powders of the invention are free flowing, their storage life is also good at elevated temperature. They can be dispersed in water within a few seconds forming creamy aqueous dispersions having a constant viscosity and good shelf life. The size of the latex particles of the dispersions obtained from the polymer powders practically corresponds to the particle size of the latex particles of the initial dispersions. The polymer powders have as good an alkali stability as the initial aqueous dispersions.

The vinyl acetate/ethylene copolymer powders of the invention are exceptionally suitable for the preparation of glues, adhesives and paints. A preferred and especially suitable application is as binding agent in plastics mortars. Mortars of this type are prepared by intensive mixing of mineral aggregates of different grain sizes with the vinyl acetate/ethylene polymer powders of the invention with final addition of water. Plasterings prepared with plastics mortars containing these powders are, surprisingly, free from cracks and very water resistant.

The following examples illustrate the invention.

EXAMPLE I

1. Preparation of the vinyl acetate/ethylene copolymer dispersion

Into a 30 l autoclave with a temperature regulating device and stirring apparatus there was introduced a solution adjusted to a pH of 5.0 of 7 g of sodium lauryl sulfate, 500 g of polyvinyl alcohol having a viscosity of the 4 % aqueous solution at 20°C of approximately 18 cP and a degree of saponification of approximately 88 mol %, 319 g of polyvinyl alcohol having a viscosity of the 4% aqueous solution at 20°C of approximately 8 cP and a degree of saponification of approximately 88 mol %, 15.3 g of anhydrous sodium acetate and 12.5 g of sodium disulfite in 7,700 g of water. The reactor was rinsed with nitrogen and ethylene to eliminate substantially all oxygen. Subsequently, the agitator was set to 150 U/min., 760 g of vinyl acetate were added and the mixture was heated to 40°C. Then a solution of 6 g of ammonium persulfate in 250 g of water was added and the mixture heated to 60°C. During the heating process ethylene was added up to a pressure of 20 atmospheres. On reaching the internal temperature of 60°C, 6,880 g of vinyl acetate and a solution of 14 g of ammonium persulfate in 600 g of water were metered in over a period of 8 hours at an internal temperature of 60°C and an ethylene pressure of 20 atmospheres. After the dosing had been completed a solution of 4 g of ammonium persulfate in 150 g of water was added to the mixture and the whole was heated for 1.5 hours at an internal temperature of 80°C. Finally, the ethylene supply was stopped and the dispersion cooled to room temperature. Then a solution of 135 g of polyvinyl alcohol having a viscosity of the 4 % aqueous solution at 20°C of approximately 18 cP and a degree of saponification of approximately 88 mol % and 86 g of polyvinyl alcohol having a viscosity of the 4 % aqueous solution at 20°C of approximately 8 cP and a degree of saponification of approximately 88 mol % in 1,250 g of water was added to the dispersion. Subsequently, the 50 % vinyl acetate-/ethylene copolymer dispersion was drawn off, and had the following properties:

| | |
|---|---|
| Polymerized ethylene content in copolymer | approximately 15 % by weight |
| Residual monomer content: | <0.5 % by weight |
| Viscosity (Epprecht-Rheometer DIII): | 90 Ps |
| Average size of the latex particles | 0.8 $\mu$ |
| Melt index $J_{21.6}^{120°C}$ (dried dispersion film): | 0.1 |

2. Preparation of the vinyl acetate/ethylene copolymer powder

Before spray drying the vinyl acetate/ethylene copolymer dispersion prepared as in Example 1,1 was diluted with water to a solids content of 40 % by weight. As drying equipment a spray tower was used the cylindrical part of which had a diameter of 1.6 m, a length of 4 m and the conical part of which had a length of 2 m. The dispersion was supplied with an eccentric screw pump to a two-product spray nozzle, the bores for the products having a diameter of 2.5 mm each. The drying was carried out in uniflow current, as drying gas nitrogen was used in a quantity of 750 m³/h. The temperature of the drying gas was 90° to 91°C at the tower entrance and 58 to 62°C in the cyclone separator. The throughput of the spraying air for the product nozzle was 20 kg/h, the pressure in front of the nozzle was 5 atmospheres gage, the temperature was 23°C. Over a second two-product nozzle which was situated near the wall, only a little below the first two-product nozzle, anti-caking agents were sprayed in the dry state.

The vinyl acetate/ethylene copolymer dispersion prepared in Example 1,(1) could be sprayed perfectly over a period of several days. The product discharge over tower cone, cyclone separator and collecting vessels took place by itself, it was not neccessary to tap these parts of the apparatus. The tower walls were covered only slightly with dry product after spray drying of over a week. This deposit could be easily blown off and had the same properties as the free flowing powder obtained in the collecting vessels. Using various anticaking agents in different quantities free flowing vinyl acetate ethylene copolymer powders were prepared. The properties of 2 powders are given below.

a. As anti-caking agent a synthetic silica having an $SiO_2$-content of 93 %, a surface area according to BET of 230 m²/g and an average particle size of approx. 0.018 $\mu$ was used in a quantity of 6 % by weight, calculated on the solids content of the aqueous dispersion. The powder was very free flowing and had an excellent storage life. After a 24 hour storage at 50°C under a load of 200 g/cm² the powder could be loosened easily. The bulk weight was 40 g/l, the volume after vibration 83 %, the weight after stamping 49 g/l. The powder could be stirred with water within a few minutes to give a 50 % aqueous dispersion. The viscosity of the dispersion was 160 Ps (Epprecht-Rheometer D/II), the minimum film forming temperature approx. 0°C, the size of b. As anti-caking agent an aluminium silicate having a $SiO_2$ content of approx. 82 % and an $Al_2O_3$ content of approx. 12 % and an average particle size of approx. 0.5 $\mu$ was used in a quantity of 14 % by weight, calculated on the solids content of the aqueous dispersion. The powder was very free flowing, the storage life was excellent. After 24 hours of storage at 50°C and under a load of 200 g/cm² the powder could be loosened easily. The bulk weight was 47 g/l, the volume after vibration was 82 %, the weight after stamping was 58 g/l. The dispersion obtainable within a few minutes with water had a viscosity of 60 Ps (Epprecht-Rheometer C II), the minimum film forming temperature was approx. 0°C, the size of the latex particles approx. 0.8 $\mu$. The powder could be worked excellently according to the given instructions 1 to 4 in the following table to mortars yielding crack-free and water resistant plasterings.

Table

Preparation of plastics mortars

| | No. 1 | No. 2 | No. 3 | No. 4 |
|---|---|---|---|---|
| Vinyl acetate ethylene copolymer powder | 127 g | 120 g | 180 g | 184 g |
| Sodium polyphosphate solution 10 % in water | 2 g | — | 2 g | 13 g |
| Defoamer Nopco 8034 | 2 g | 1 g | 2 g | 2 g |
| Titanium dioxide rutile type RN 56 | 10 g | 44 g | 65 g | 50 g |
| Calcite, size of grain 10–30 $\mu$ | 490 g | — | — | — |
| natural Mg/Al-silicate/ size of grain approx. 1 mm | 30 g | — | — | — |
| natural Mg/Al-silicate/ size of grain 65 % 0.2–64 $\mu$, 35 % > 64 $\mu$ | 60 g | — | — | — |
| natural calicite type, medium size of grain 5 $\mu$ | 30 g | 13 g | 47 g | 65 g |
| natural calicite type, medium size of grain 13–15 $\mu$ | 88 g | — | 60 g | 33 g |
| natural calicite type, medium size of grain 40 $\mu$ | — | — | — | 160 g |
| natural calicite type, medium size of grain 130 $\mu$ | — | — | — | 275 g |
| quartz sand, size of grain 50 % <0.315 mm, 40 % <0.2 mm 8 % <0.1 mm | — | 450 g | 260 g | — |
| quartz sand, size of grain 100 % <0.315 mm, 65 % <0.2 mm 0.1 mm | — | — | 75 g | — |
| quartz grit, size of grain 5 mm | — | 105 g | — | — |
| quartz grit, size of approx. 4 mm | — | 90 g | — | — |
| quartz powder, size of grain 80 % <40 $\mu$ | — | — | 37 g | — |
| water | 140 g | 120 g | 140 g | 160 g | the latex particles approx. 1 $\mu$. The dispersion had a long storage life. Plastics mortars of various compositions were prepared and applied on asbestos cement plates in a thickness increasing from 1 to 10 mm. The mortars were prepared by intensely mixing the powders with mineral aggregates of different grain size subsequently adding water and anti-foaming agent and intensely mixing again for a short time. A part of the mortars was immediately applied after the preparation, a second part was applied after a 24 hour maturing time. All the plasterings prepared with the mortars were completely crack-free. Furthermore it was ascertained that the plasterings were surprisingly completely water-resistant. Also after a weeks storage in water the plasterings remained hard and the water completely clear. The polymer powder was also suitable for preparing glues and adhesives, for example for sticking PVC- furniture foils onto chip boards and as binding agents for pigments, for example for the preparation of paints.

EXAMPLE II

1. Preparation of the vinyl acetate/ethylene copolymer dispersion

The vinyl acetate/ethylene copolymer dispersion was prepared as in Example I, 1, however, instead of the aqueous polymerization mixture used in said example, an aqueous solution of 820 g of polyvinyl alcohol having a viscosity of the 4 % aqueous solution at 20°C of approximately 4 cP and a degree of saponification of approximately 88 mol %, 15.3 g of anhydrous sodium acetate, 12.5 g of sodium disulfite and 7,700 g of water was used. The process was carried out as in Example I, 1. After polymerization and cooling a solution of 220 g of a polyvinyl alcohol having a viscosity of the 4 % aqueous solution at 20°C of approximately 4 cP and a degree of saponification of approx. 88 mol % in 6,400 water was added to the vinyl acetate/ethylene copolymer dispersion and the mixture stirred for a further hour. A 40 % vinyl acetate/ethylene copolymer dispersion with the following properties was obtained:

| | |
|---|---|
| Polymerized ethylene content in the copolymer: | approximately 14 % by weight |
| residual monomer content: | <0.5 % |
| Viscosity: (Epprecht-Rheometer C III): | 8 Ps |
| Average size of the latex particles: | 0.8 μ |
| Minimum film formation temperature: | approximately 0°C |
| Melt index $J_{21.6}^{120°C}$ (dispersion film): | 1.1 |

2. Preparation of the vinyl acetate/ethylene compolymer powder

The process was carried out as in Example I, 2, using as anti-caking agent an aluminium silicate with a surface area according to BET of 110 m²/g, an average particle size of 0.035 μ, an $SiO_2$-content of 78 % and an $Al_2O_3$-content of 8 % in a quantity of 12 %, calculated on the solids content of the aqueous dispersion.

A free flowing polymer powder was obtained which could be stirred with water within a few minutes to give a 50 % aqueous dispersion having a viscosity of 40 Ps (Epprecht-Rheometer C II), an average size of the latex particles of 1 μ and a minimum film forming temperature of approx. 0°C. The storage life was excellent, after 24 hours storage at 50°C and under a load of 200 g/cm² the powder was unaltered. According to the given instructions plastics mortars were prepared. The plasterings made therefrom were, without exception, crack-free and water resistant.

EXAMPLE III

1. Preparation of the vinyl acetate/ethylene copolymer dispersion

The dispersion was prepared as in Example I, (1); however, instead of the aqueous polymerization mixture used there, an aqueous solution of 4 g of sodium lauryl sulfate, 650 g of polyvinyl alcohol having a viscosity of the 4 % aqueous solution at 20°C of approx. 8 cP and a degree of saponification of approx. 88 mol %, 15.3 g of anhydrous sodium acetate, 12.5 g of sodium disulfite and 7,600 g of water was used. The process was carried out as in Example I, (1), however the polymerization was carried out at an ethylene pressure of 15 atmospheres. The vinyl acetate/ethylene copolymer dispersion obtained after dilution to a solids content of 40 % had the following properties:

| | |
|---|---|
| Polymerized ethylene content in the copolymer: | approximately 11 % by weight |
| residual monomer content: | <0.5 % |
| Viscosity (Epprecht-Rheometer C III): | 3 Ps |
| Average size of the latex particles: | 0.7 μ |
| Minimum film formation temperature: | approximately 0°C |
| Melt index $J_{21.6}^{120°C}$ (dispersion film): | 0.8 |

2. Preparation of the vinyl acetate/ethylene copolymer powder

The process is carried out as in Example I, (2a). The polymer powder obtained was easily dispersible, the vicosity of the 50 % aqueous dispersion prepared from the powder, was 110 Ps, the minimum fim forming temperature was approx. 0°C, the size of the latex particles was 0.9 μ. According to the given instructions mortars were prepared using this polymer powder. The plasterings made therefrom were crack-free and water-resistant.

EXAMPLE IV

1. Preparation of a vinyl acetate/vinyl chloride/ethylene-terpolymer dispersion

The process was carried out as in Example I, 1, however, instead of vinyl acetate a mixture of 9 parts by weight of vinyl acetate and 1 part by weight of vinyl chloride was used and the ethylene pressure was raised to 30 atmospheres. The aqueous dispersion had the following properties:

| | |
|---|---|
| Polymerized ethylene content in the terpolymer: | approximately 19 % by weight |
| residual monomer content: | <0.5 % by weight |
| Viscosity (Epprecht-Rheometer D III): | 78 Ps |
| Average size of the latex particles: | 0.8 μ |
| Minimum film formation temperature: | approximately 0°C |

2. Preparation and properties of the terpolymer powder

The polymer powder was prepared as in Example I, 2. As anti-caking agent a synthetic silica having an $SiO_2$-content of 93 %, a surface area according to BET of 230 m²/g and an average particle size of 0.018 μ was used in a quantity of 6 % by weight, calculated on the solids content of the aqueous dispersion. The powder was free flowing and stable on storage, it could be easily stirred with water to a stable, creamy 50 % aqueous dispersion and plasterings produced with plastics mortars containing the powder showed no cracks and were stable when stored under water.

What is claimed is:

1. A process for the preparation of a free-flowing and easily dispersible polymer powder comprising a copolymer of vinyl acetate and ethylene and optionally at least one further olefinically unsaturated monomer, wherein said copolymer is dried in a tower as an aqueous dispersion prepared by copolymerization of the monomers in an aqueous system at an ethylene pressure of up to 100 atmospheres and in the presence of from 0 to 1 % by weight, calculated on the polymer, of an ionic emulsifier, the improvement comprising adding to said aqueous system from 5 to 20 % by weight, calculated on the polymer, of at least one polyvinyl alcohol with a degree of saponification of from 80 to 92 mol % and a viscosity of a 4 % aqueous solution of said polyvinyl alcohol at 20°C from 3 to 35 cP, said copolymerization being in the presence of a free radical initiator in said aqueous system, and spray drying said aqueous dispersion by simultaneously introducing into a spray-drying tower at least one dry anticaking agent selected from the group consisting of aluminium silicate, silica and calcium carbonate in an amount of from 3 to 30 % by weight, calculated on the solids content of the aqueous dispersion, said anticaking agent having an average particle size of from 0.01 to 0.5 μ.

2. A process as claimed in claim 1 wherein said further olefinically unsaturated monomer is a vinyl ester of a linear or branched saturated aliphatic monocarboxylic acid having 3 to 18 carbon atoms, an arcylic, methacrylic, maleic or fumaric acid ester of a linear or branched saturated aliphatic monohydric alcohol, having 1 to 18 carbon atoms, vinyl chloride, isobutylene or a higher α-mono-olefin having 4 to 12 carbon atoms, the sodium salt of vinyl sulfonic acid, acrylic, methacrylic, crotonic or itaconic acid, a maleic acid monoester of a linear branched saturated aliphatic monohydric alcohol having 1 to 18 carbon atoms, diallyl maleate, diallyl phthalate, triallyl cyan urate tetraallyl oxethane or adipic acid divinyl ester.

3. A process as claimed in claim 1 wherein 50 to 90 % by weight of the polyvinyl alcohol is added to the aqueous system before polymerization and 10 to 50 % by weight of the polyvinyl alcohol is added to the aqueous dispersion after polymerization.

* * * * *